(12) United States Patent
Mathis et al.

(10) Patent No.: US 7,096,849 B1
(45) Date of Patent: Aug. 29, 2006

(54) CHARGE MOTION CONTROL PLATE KIT

(75) Inventors: William Mathis, Margate, FL (US); Christopher Lyew, Lake Worth, FL (US)

(73) Assignee: Steeda Autosports, Inc., Pompano Beach, FL (US)

( * ) Notice: Subject to any disclaimer, the term of this patent is extended or adjusted under 35 U.S.C. 154(b) by 0 days.

(21) Appl. No.: 11/180,444

(22) Filed: Jul. 12, 2005

(51) Int. Cl.
*F02B 31/04* (2006.01)
*F02M 29/04* (2006.01)

(52) U.S. Cl. .................. 123/306; 123/308; 123/590
(58) Field of Classification Search ............... 123/302, 123/306, 308, 531, 590, 592, 593
See application file for complete search history.

(56) References Cited

U.S. PATENT DOCUMENTS

| | | | | |
|---|---|---|---|---|
| 5,046,475 | A * | 9/1991 | Thompson | 123/585 |
| 5,477,823 | A * | 12/1995 | Uchida | 123/308 |
| 5,636,613 | A * | 6/1997 | Aoyama et al. | 123/432 |
| 5,651,344 | A * | 7/1997 | Nishigaki et al. | 123/432 |
| 5,852,994 | A * | 12/1998 | Tsuzuku et al. | 123/308 |
| 5,913,298 | A * | 6/1999 | Yoshikawa | 123/306 |
| 5,950,582 | A | 9/1999 | Stein | |
| 6,131,554 | A * | 10/2000 | Ito et al. | 123/568.14 |
| 6,170,460 | B1 * | 1/2001 | Buswell et al. | 123/306 |
| 6,276,330 | B1 | 8/2001 | Adamisin et al. | |
| 6,394,066 | B1 * | 5/2002 | Chou et al. | 123/308 |
| 6,453,888 | B1 * | 9/2002 | Ueda et al. | 123/531 |
| 6,520,146 | B1 * | 2/2003 | Laimbock | 123/308 |
| 6,520,165 | B1 * | 2/2003 | Steele | 123/590 |
| 6,561,172 | B1 * | 5/2003 | Chestnut et al. | 123/585 |
| 6,595,175 | B1 * | 7/2003 | Capoferi et al. | 123/184.46 |
| 6,601,562 | B1 * | 8/2003 | Buswell et al. | 123/306 |
| 6,705,280 | B1 * | 3/2004 | Lippert | 123/306 |
| 6,705,284 | B1 | 3/2004 | Russell et al. | |
| 6,712,041 | B1 | 3/2004 | Russell et al. | |
| 6,725,828 | B1 | 4/2004 | Han et al. | |
| 6,735,937 | B1 | 5/2004 | Sumilla et al. | |
| 6,739,302 | B1 | 5/2004 | Jones et al. | |
| 6,752,124 | B1 * | 6/2004 | Chang | 123/306 |
| 6,782,872 | B1 * | 8/2004 | Moschini et al. | 123/470 |
| 6,827,054 | B1 | 12/2004 | Bucknell et al. | |
| 6,863,046 | B1 * | 3/2005 | Laimbock | 123/308 |
| 6,895,924 | B1 * | 5/2005 | Buswell et al. | 123/306 |

OTHER PUBLICATIONS

AVL Product Literature, "Controlled Burn Rate—CBR", Website http://tec.avl.com (May, 2005).
Mustangheaven.com Product Literature, "2005 Ford Mustang", Website http://www.mustangheaven.com (May, 2005).
Ford-Trucks.com Product Literature, "2004 Ford F150 Powertrain", Website http://www.ford-trucks.com (Apr. 2005).
Mann-Hummel.com Product Literature, "Intake manifold systems", Website http://www.mann-hummel.com (May, 2005).
Mann-Hummel Product Literature, "Air intake systems and modules".

* cited by examiner

*Primary Examiner*—Hai Huynh
(74) *Attorney, Agent, or Firm*—McHale & Slavin, P.A.

(57) ABSTRACT

The present invention provides a charge motion plate kit for internal combustion engines. More specifically, the charge motion plate kit permits replacement of the OEM charge motion valves of the prior art for high performance applications. In one embodiment, the charge motion plate kit comprises a single charge motion plate for each bank of cylinders, each charge motion plate includes at least one aperture for each cylinder within the bank. The plates are constructed to mount juxtaposed to the intake manifold mounting flange and the cylinder head intake manifold mounting surface in a sandwiched configuration.

15 Claims, 3 Drawing Sheets

CHARGE MOTION CONTROL PLATE KIT

FIELD OF THE INVENTION

The present invention relates to a device for quickly and easily replacing the pre-existing charge motion control valves within a vehicular air intake system with a charge motion control plate having a higher air flow rate for racing and/or high performance street applications.

BACKGROUND OF THE INVENTION

The versatility and performance of newer muscle cars such as the FORD MUSTANG permit owners to use one vehicle for multiple purposes. Often the same vehicle used to carry groceries home from the supermarket is used for racing applications on the weekend. Owners will often modify their vehicle to make it more competitive in their chosen form of racing. One of the most modified areas of a vehicle for racing applications is the engines air induction system.

Tuning the air induction system can be one of the most critical aspects of getting a vehicle to produce horsepower and torque for either street or racing applications. The basic function of an air induction system is to provide an optimized and evenly distributed flow of fresh air from the air filter to the combustion chamber. The intake manifold is the primary component of the air induction system. In a fuel injected engine the intake manifold includes at least one air intake conduit for each cylinder. The air intake conduit generally extends between the throttle body and the intake port(s) leading to the combustion chamber. In addition to the mere routing of air, today's intake manifolds may also include dynamic supercharging, swirl and tumble control, positive crankcase ventilation and exhaust gas re-circulation.

Charge motion control valves ("CMCVs") are often used within air induction systems in order to modify the flow of air and fuel into the engine's cylinders. A CMCV is typically and operatively disposed within an air intake conduit of the air induction system "upstream" from a fuel injector. The CMCV is effective to alter the flow of air into the cylinder during certain vehicle operating modes (e.g., during relatively low engine speed and load conditions), and is effective to create turbulence within the cylinder.

One type of CMCV is designed for use in combination with a "Siamese" type intake port which includes an air intake port that splits or "branches" into a pair of separate ports that communicate with one of the engine's cylinders. This type of CMCV is typically and operatively disposed in close proximity to the location where the air intake port splits and is designed to alter the flow of air into each of the port branches. These CMCVs are commonly referred to as "swirl" type CMCVs and are typically designed to substantially "cover" one side of the air intake port, thereby preventing air from entering one of the branches. In this manner, the CMCV provides a "fuel rich" mixture within the covered branch that is subsequently discharged into the cylinder and combusted. Additionally, this type of CMCV covers only a portion of the other side of the main air intake port, effective to allow a substantial amount of air to flow into the other branch and to create a "fuel lean" mixture in that branch that is subsequently discharged into the cylinder and combusted along with the fuel rich mixture. This flow of air into the cylinder creates a swirling effect or turbulence which causes the fuel rich mixture and fuel lean mixture to combine for combustion.

While these prior CMCVs provide emissions benefits, low RPM, and low load engine operation, they suffer some drawbacks which adversely effect the efficiency of the engine during certain operating conditions. For example and without limitation, during cold start operating conditions (i.e., when the vehicle is being started after being exposed to relatively cold temperatures), fuel often condenses on the intake valves due to a lack of heat. Because this type of prior CMCV substantially blocks air from flowing into one of the port branches, condensed fuel often remains on the intake valve within that branch and/or enters the cylinder as a liquid stream and is thus not properly combusted within the cylinder. This undesirably leads to oil degradation, waste fuel, and increased hydrocarbon emissions.

Another prior type of CMCV, commonly referred to as a "tumble" type CMCV, is used to create a "tumbling" flow of air into the cylinders. This type of CMCV provides substantially symmetrical passages for air to flow to each intake valve. Hence, this type of CMCV provides a substantially similar air/fuel mixture and airflow within each branch port. While this type of CMCV prevents condensation from remaining on the intake valves, it substantially restricts air flowing into the combustion chamber. The restriction of air limits the device to use at low engine RPMs and low engine torque requirements.

Another type of CMCV is used to create both tumble and swirl air flow into the cylinders. This type of CMCV provides more air to one intake branch than to the other. This construction prevents some fuel from condensing on the valve receiving the least amount of air and provides a swirl to the combustion chamber via the predominant air flow to the second branch. While this type of CMCV provides some advantages over the other types of CMCVs, because only 10% of the air being supplied to the cylinder is allowed to flow through one branch of the intake, condensed fuel often remains on the intake valve within that branch and/or enters the cylinder as a liquid stream and is thus not properly combusted within the cylinder. This undesirably leads to oil degradation, waste fuel, and increased hydrocarbon emissions.

In addition to the air restriction present in all of the CMCV constructions of the prior art, the devices add substantial complexity to an already complex air induction system. The CMCVs require a pivotally mounted butterfly type valve for each intake branch. The butterfly valves must be coordinated for uniform opening and closing in response to engine speed and torque demands. The coordination requires a combination of solenoids, stepper motors and/or vacuum motors. The motors must be in electrical communication with the on-board computer and a vast array of sensors to cause the CMCVs to open above a predetermined RPM or engine torque requirement to prevent fuel and air starvation. Starving of the engine from fuel and/or air could create dangerous driving situations, as the engine would not respond properly to operator throttle demands.

Accordingly, what is needed in the art is a charge motion plate for high-performance applications. The charge motion plate should achieve objectives such as: even distribution of the fuel and air mixture to both branches of a siamese intake port arrangement, reduced airflow restriction for crisper throttle response and increased horsepower, compatibility with original equipment manufacturer "OEM" or aftermarket turbo chargers and superchargers, and compatibility with nitrous oxide injection systems.

In addition, the charge motion plate should be easily manufactured without moving parts to malfunction or adjust. The charge motion plates should include packaging flexibility for installation on various vehicle configurations including retrofitting existing vehicles with minimal modification to the existing air induction system.

SUMMARY OF THE INVENTION

The present invention provides a charge motion plate kit for internal combustion engines. More specifically, the charge motion plate kit permits replacement of the OEM charge motion valves of the prior art for high performance applications. In one embodiment, the charge motion plate kit comprises a single charge motion plate for each bank of cylinders, each charge motion plate includes at least one aperture for each cylinder within the bank. For example, a charge motion plate kit for a four cylinder engine would include one charge motion plate with at least four air flow apertures, and a charge motion plate kit for an eight cylinder engine would include two charge motion plates each including at least four air intake apertures. The plates are constructed to mount juxtaposed to the intake manifold mounting flange and the cylinder head intake manifold mounting surface in a sandwiched configuration.

The pre-existing OEM CMCVs include cast or injection molded plates. Each plate includes an aperture aligned with each cylinder of the engine. An elongated rod extends longitudinally through the center portion of each plate. A stamped sheet metal plate is mounted to the rod within each aperture. A pneumatic or electric motor attaches to the rod to provide rotational movement for opening and closing the sheet metal valves in response to commands from the vehicle's on-board computer.

The instant invention provides a charge motion plate kit which replaces the charge motion control valves of the prior art. The charge motion control plates of the instant invention are preferably constructed of billet aluminum and provide increased air flow when compared to the prior art CMCVs. Each plate includes a first surface and a second surface. The first surface is positionable juxtaposed to the intake surface of the cylinder head while the second surface is positionable juxtaposed to the intake manifold mounting flange. The charge motion control plates include an outer contoured perimeter which allows the plates to be mounted to a broad range of engine configurations without interference from sensors or other engine components. In the preferred embodiment, each charge motion control plate includes an air/fuel flow aperture extending through the plate for each cylinder of one engine cylinder bank. The air/fuel flow apertures are sized and shaped to approximate the size and shape of the engines intake ports. In the case of siamese intake ports, the air/fuel flow apertures are preferably sized and shaped to approximate the size and shape of both siamese ports without a divider rib. However, in some application, the divider rib may be included to further modify the flow characteristics of air entering the cylinder. The charge motion control plates also preferably include a plurality of through holes constructed and arranged to align with existing fastener apertures in the intake manifold and cylinder head for secure attachment of the charge motion control plates. Alternatively, the plates may be constructed and arranged for adhesive attachment to either or both the intake manifold and/or cylinder head.

In one embodiment each air flow aperture within the charge motion control plate(s) includes a threaded aperture extending from an outer surface through to the air flow aperture(s) for attachment of a nitrous oxide manifold. The threaded aperture(s) facilitate easy attachment of a nitrous oxide injection system for additional horsepower production.

Accordingly, it is an objective of the present invention to provide a charge motion control plate kit for vehicles with OEM installed charge motion control valves.

An additional objective of the present invention is to provide a charge motion control plate kit which provides even distribution of the fuel and air mixture to both branches of a siamese intake port arrangement.

It is a further objective of the present invention to provide a charge motion control plate kit that reduces airflow restriction, when compared to the prior art CMCVs, for crisper throttle response and increased horsepower production.

A still further objective of the present invention is to provide a charge motion control plate kit which provides compatibility with OEM or aftermarket turbo chargers, superchargers and nitrous oxide injection systems.

Another objective of the present invention is to provide a charge motion control plate kit for vehicles which is simple to install and which is ideally suited for original equipment and aftermarket installations.

Yet another objective of the present invention is to provide a charge motion plate kit that can be inexpensively manufactured and which is simple and reliable in operation.

Still another objective of this invention is to provide a charge motion control plate kit that does not require moving parts to malfunction or adjust.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
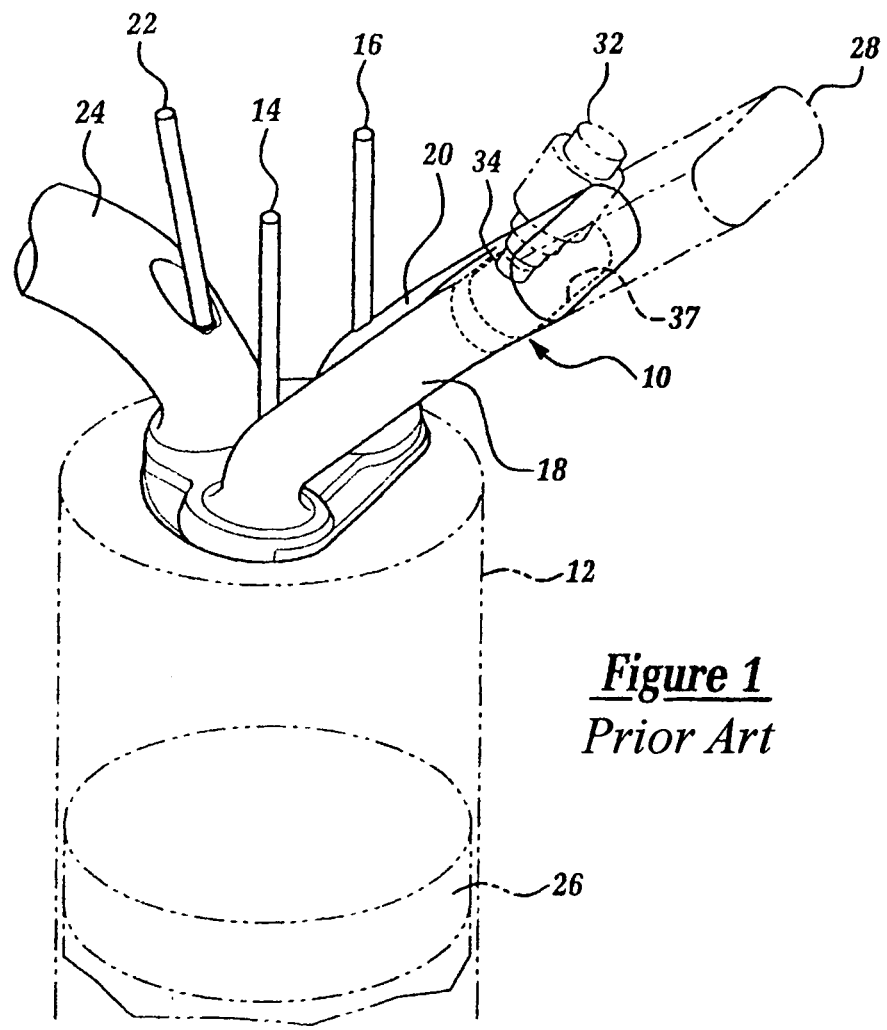
FIG. 1 is a perspective view of a cylinder of an internal combustion engine illustrating a prior art charge motion control valve.
Figure 2:
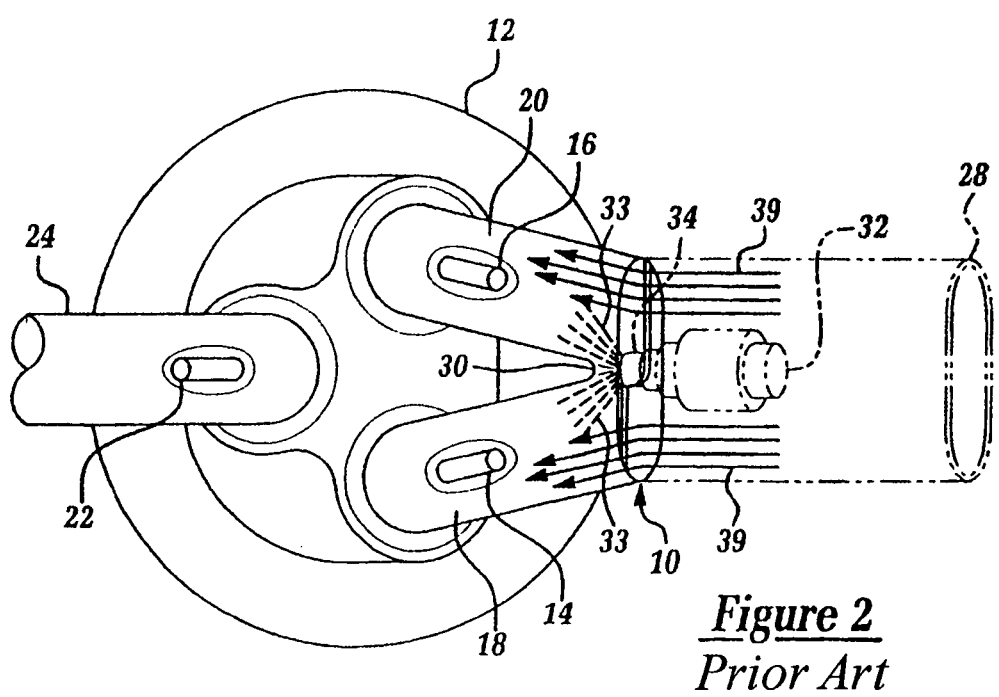
FIG. 2 is a top view of the cylinder including the prior art charge motion control valve illustrated in FIG. 1.
Figure 3:
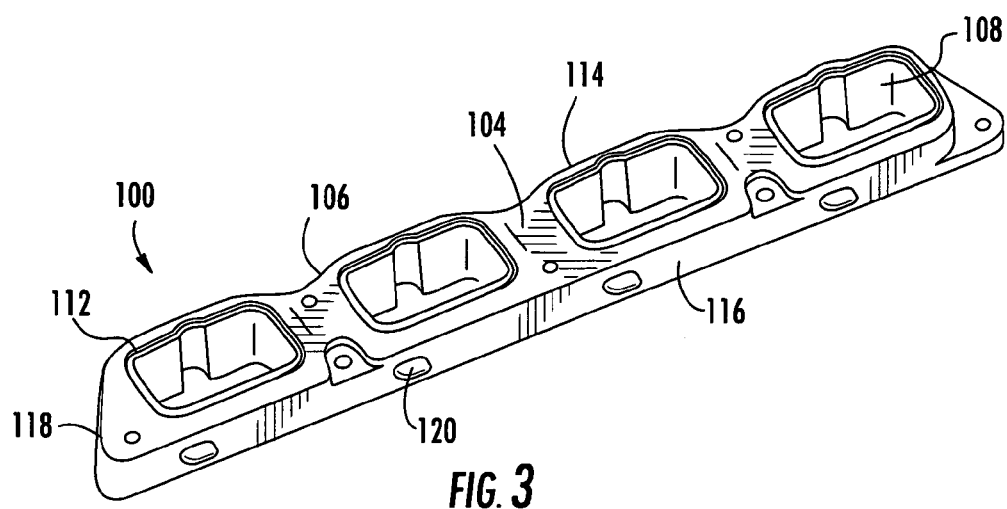
FIG. 3 is a perspective view of the charge motion control plate of the instant invention.
Figure 4:
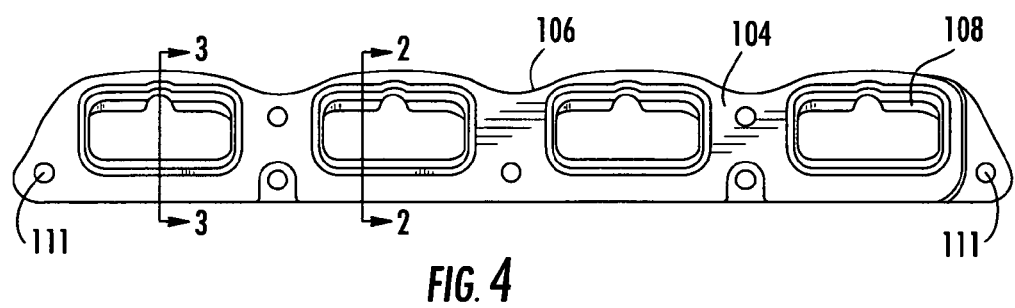
FIG. 4 is a side view of the charge motion control plate of the instant invention.
Figure 5:
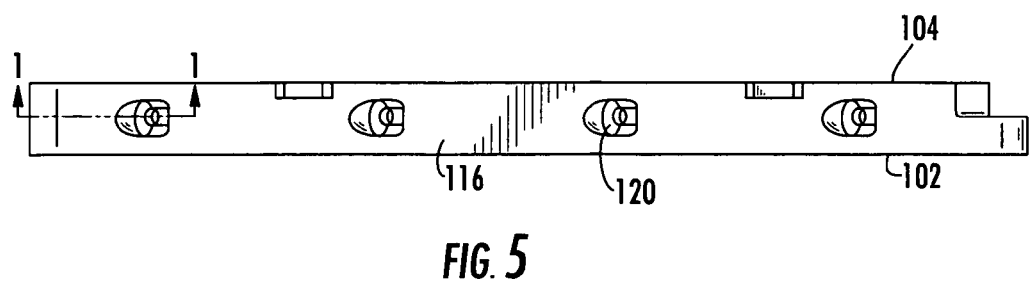
FIG. 5 is a bottom view of the charge motion control plate of the instant invention.
Figure 6:
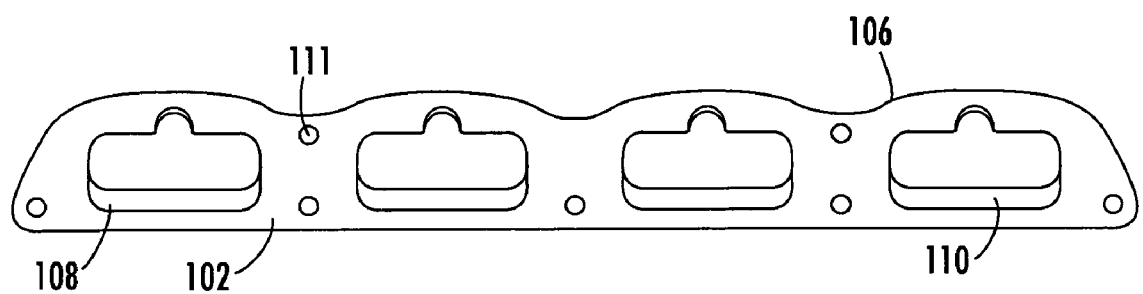
FIG. 6 is a side view of the charge motion control plate of the instant invention.
Figure 7:
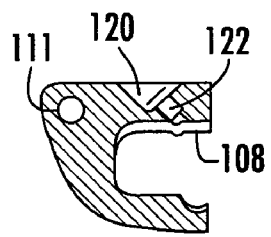
FIG. 7 is a section view of the charge motion control plate taken along lines 1—1 of FIG. 5.
Figure 8:
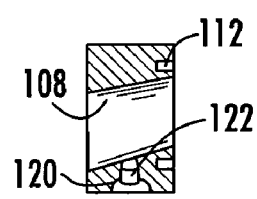
FIG. 8 is a section view of the charge motion control plate taken along lines 2—2 of FIG. 4.
Figure 9:
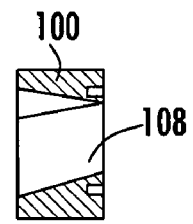
FIG. 9 is a section view of the charge motion control plate taken along lines 3—3 of FIG. 4.

Referring now to FIGS. 1 and 2, there is shown a prior art charge motion control valve 10. The device is adapted for use in combination with an internal combustion engine of the type having at least one cylinder 12. Cylinder 12 includes a pair of intake valves 14, 16, which selectively and respectively allow intake ports 18, 20 to be fluidly connected to cylinder 12 and to deliver an air and fuel mixture to cylinder 12. Cylinder 12 further includes at least one exhaust valve 22 which selectively discharges exhaust gasses from the cylinder 12 through discharge port 24. Cylinder 12 further includes a conventional piston 26 which is slidably disposed within cylinder 12.

Intake ports 18 and 20 comprise "Siamese" type intake ports which are integrally and fluidly joined to an air intake conduit 28 which splits or "branches" at point 30, thereby supplying intake ports 18 and 20. A conventional fuel injector 32 is operatively disposed within port 28 and includes a conventional "split" spray nozzle 34 which is operatively disposed in relative close proximity to point 30 and which is effective to selectively spray a stream of atomized fuel 33 into ports 18 and 20.

The prior art charge motion control valve ("CMCV") 10 is made from a relatively thin heat resistant metal material. CMCV 10 is mounted along a rod (not shown) in a typical manner for pivotal movement within port 28. An electric or vacuum motor (not shown) is secured to the rod for opening and closing the CMCV in response to commands from the on-board computer. In the closed position the nozzle portion 34 of fuel injector 32 extends past valve 10 and discharges fuel slightly "downstream" from valve 10.

Referring to FIGS. 3–6, one embodiment of the instant invention charge motion control plate 100 is illustrated. The instant invention provides a charge motion control plate kit which replaces the charge motion control valves 10 (FIGS. 1 and 2) of the prior art. Each plate is generally rectangular in shape and includes a first surface 102, a second surface 104, a top surface 114, a bottom surface 116 and a pair of end surfaces 118. The first surface is positionable juxtaposed to the intake surface of the cylinder head while the second surface is positionable juxtaposed to the intake manifold mounting flange. Each charge motion control plate 100 includes an outer contoured perimeter 106 which allows the plates to be mounted to a broad range of engine configurations without interference from sensors or other engine components. In the preferred embodiment, each charge motion control plate includes at least one air/fuel flow aperture 108 extending through the plate for each cylinder of each engine cylinder bank. The air/fuel flow apertures 108 are sized and shaped to approximate the size and shape of the engines intake ports 18 and 20 (FIGS. 1 and 2). In the case of siamese intake ports, the air flow apertures are preferably sized and shaped to approximate the size and shape of both siamese ports without a divider rib. However, in some applications a divider rib (not shown) may be included to further modify or control the flow characteristics of air entering the cylinder. In a most preferred embodiment, the air flow aperture 108 includes angled perimeter surfaces 110 which provide a directed air flow into the intake ports. One embodiment of the charge motion control plates 100 also preferably include a plurality of through holes 111 constructed and arranged to align with existing fastener apertures in the intake manifold and cylinder head for secure attachment of the charge motion control plates. The first and/or second surface 102, 104 may also include a seal constructed and arranged to prevent air from leaking between the mounting surfaces and into the combustion chamber. In a non-limiting embodiment, the preferred seal includes an O-ring groove 112 and a cooperating O-ring (not shown). Alternative seals, which may include, but should not be limited to gaskets, overlapping seals, copper seals, compression seals and suitable combinations thereof may be utilized in place of the O-ring and O-ring groove. Alternatively, the plates may be constructed and arranged for adhesive attachment to either or both the intake manifold and/or cylinder head. Adhesives suitable for attachment of the charge motion control plates are described in, but should not be limited to, U.S. Pat. No. 6,739,302 incorporated herein by reference.

Referring to FIGS. 3, 5, 7–8, one embodiment of the charge motion control plates is illustrated. In this embodiment, the bottom surface of the outer contoured perimeter includes at least one nitrous oxide injection port 120 for transfer of a nitrous oxide gas into the air flow aperture 108. The nitrous oxide injection port(s) extends between the outer contoured perimeter and the air flow aperture(s). The nitrous oxide injection ports may be drilled at a suitable angle for ease of attaching the nitrous oxide injection system and preferably include internal threads 122 for attachment of fittings and the like. Alternative means of attaching nitrous oxide injection systems such as snap rings, epoxy, integrally formed fittings and the like may alternatively be utilized without departing from the scope of the invention.

In a most preferred and non-limiting embodiment, the charge motion control plate(s) are constructed of aluminum and are about 1 3/16 inches thick. It should be appreciated that the charge motion control plate(s) may be made thinner or thicker as the space requirements, materials and engine configurations require. The charge motion control plate may alternatively be made from other materials which may include, but should not be limited to steel, titanium, plastic or suitable combinations thereof.

The charge motion plates of the instant invention may be installed on vehicles which include OEM installed CMCVs by simply removing the CMCV from its position between the air conduit and the first and second intake ports and securing the instant invention charge motion control plate(s) between the air conduit and the first and second intake ports. Once the charge motion plates are secured in place, air may be drawn or directed through the air conduit by the engine, wherein the air is divided into substantially equal amounts entering into the first intake port and the second intake port to carry a fuel into the cylinder.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope.

Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. In an internal combustion engine, wherein said internal combustion engine includes at least one cylinder, wherein said at least one cylinder includes a first and a second intake valve, wherein said first intake valve is disposed in a first intake port and said second intake valve is disposed in a second intake port, said internal combustion engine including an air induction system, said air induction system including an air intake manifold, said air intake manifold including an air conduit for each said at least one cylinder, said air conduit including a charge motion control valve for substantially restricting an air flow to at least one of said intake ports during low speed operation of said internal combustion engine, a kit for replacing said charge motion control valve comprising:

at least one valveless charge motion control plate, each said valveless charge motion control plate including a first surface and a second surface, said first surface constructed and arranged to be positioned juxtaposed to an intake surface of a cylinder head, said second surface constructed and arranged to be positioned juxtaposed to an intake manifold mounting flange, wherein said at least one charge motion control plate is positioned between said air intake manifold and said first and said second intake ports, wherein said at least one charge motion control plate includes a single air flow aperture for each said cylinder, wherein each said air flow aperture is constructed and arranged to receive air flowing through said air conduit and divide said air, for delivery into said first and said second intake ports whereby substantially equal portions of said air flow enters said at least one cylinder through said first and said second intake valve throughout the entire range of engine operation speeds.

2. The charge motion control plate as set forth in claim 1 wherein each said air flow aperture for each said at least one cylinder, includes at least one angled perimeter surface to provide directed air flow into said first and said second intake ports, wherein said at least one air flow aperture is sized and shaped to substantially match the size and shape of said first and said second intake ports proximate to said first surface and wherein said at least one air flow aperture is sized and shaped to substantially match the size and shape of said air flow conduit proximate to said second surface.

3. The charge motion control plate as set forth in claim 1 wherein said at least one charge motion control plate includes an outer contoured perimeter, wherein said outer contoured perimeter is constructed and arranged to prevent interference with components of said internal combustion engine.

4. The charge motion control plate as set forth in claim 3 wherein said outer contoured perimeter includes a top surface, a bottom surface and a pair of end surfaces, wherein said top surface includes at least one nitrous oxide injection port for each said air flow aperture for transfer of a nitrous oxide gas into said air flow aperture, wherein said at least one nitrous oxide injection port extends between said outer contoured perimeter and said at least one air flow aperture.

5. The charge motion control plate as set forth in claim 1 wherein at least one of said first surface or said second surface include at least one O-ring groove extending around the perimeter of each said air flow aperture, each said O-ring groove constructed and arranged to accept an O-ring, wherein said O-ring provide an airtight seal around the perimeter of said air flow aperture.

6. The charge motion control plate as set forth in claim 1 wherein said first surface is constructed and arranged for adhesive attachment to said intake manifold mounting surface of said internal combustion engine.

7. The charge motion control plate as set forth in claim 1 wherein said second surface is constructed and arranged for adhesive attachment to said intake manifold mounting flange.

8. The charge motion control plate as set forth in claim 1 wherein charge motion control plate includes a plurality of transversly oriented fastener apertures, wherein said plurality of fastener apertures are constructed and arranged to accept a plurality of fasteners for securing said charge motion control plate between said air intake manifold and said first and said second intake ports.

9. A charge motion control plate for use with an engine of the type including an air intake manifold which branches into a first and a second intake port which communicate with a cylinder, a fuel injector which injects fuel into said first and second intake ports, said engine further comprising a first intake valve which is operatively disposed within said first intake port and a second intake valve which is operatively disposed within said second intake port, a valveless charge motion control plate being operatively disposed between said intake manifold and said first and second intake ports, said charge motion control plate including at least one air flow aperture extending through said charge motion control plate, said at least one air flow aperture sized and shaped to substantially match the size and shape of said first and said second intake ports, wherein said air flow aperture forms an unrestricted area effective to allow substantially equal amounts of air to enter into said first intake port and said second intake port throughout the operational range of said engine, wherein said air is effective to carry a fuel into said cylinder and to create turbulence within said cylinder for combustion thereof.

10. The charge motion control plate as set forth in claim 9 wherein said charge motion control plate includes at least one nitrous oxide injection port for transfer of a nitrous oxide gas into each said air flow aperture, wherein said at least one nitrous oxide injection port extends between an outer contoured perimeter and said at least one air flow aperture.

11. The charge motion control plate as set forth in claim 9 wherein said charge motion plate includes 3 air flow apertures.

12. The charge motion control plate as set forth in claim 9 wherein said charge motion plate includes 4 air flow apertures.

13. A valveless charge motion control plate for use with an engine of the type including a primary air intake manifold which is fluidly connectable to a first intake port and a second intake port for supplying air to a cylinder of said engine, a fuel injector having a nozzle which is disposed within said primary air intake manifold and which selectively discharges fuel into said first and second ports, said valveless charge motion control plate comprising:

an elongated plate, said elongated plate including a first surface and a second surface, said first surface constructed and arranged to be positioned juxtaposed to an intake surface of a cylinder head, said second surface constructed and arranged to be positioned juxtaposed to an intake manifold mounting flange, wherein said at least one valveless charge motion control plate is positioned at least partially upstream with respect to said nozzle, said valveless charge motion control plate including at least one air flow aperture extending therethrough, said at least one air flow aperture sized and shaped to substantially match the size and shape of said first and said second intake ports proximate to said first surface, wherein said air flow aperture forms an unrestricted area effective to allow substantially equal amounts of air to enter into said first intake port and said second intake port throughout the operating range of said engine, wherein said air is effective to carry a fuel into said cylinder.

14. The charge motion control plate as set forth in claim 13 wherein said at least one air flow aperture includes at least one angled perimeter surface to provide directed air flow into said first and said second said intake ports, wherein said at least one air flow aperture is sized and shaped to substantially match the size and shape of said air flow conduit proximate to said second surface.

15. A method for improving the flow of air within an air induction system of an internal combustion engine of the type including a intake manifold, said intake manifold including an air conduit for each cylinder of said engine, wherein each said air conduit branches into a first intake port and a second intake port, wherein a charge motion control valve is positioned between said air conduit and said first and second intake ports, said charge motion control valve constructed for selectively and fluidly connecting said air conduit and said first and second intake ports, said method comprising the steps of:

removing said charge motion control valve from said position between said air conduit and said first and second intake ports;

securing a charge motion control plate between said air conduit and said first and second intake ports, wherein said charge motion control plate includes at least one air flow aperture extending therethrough, said at least one air flow aperture sized and shaped to substantially match the size and shape of said first and said second intake ports;

directing air through said air conduit, wherein said air is divided into substantially equal amounts entering into said first intake port and said second intake port, wherein said air is effective to carry a fuel into said cylinder.

* * * * *